June 9, 1942.  F. MACCOY  2,285,776
HOT WATER BOTTLE
Filed Sept. 12, 1941
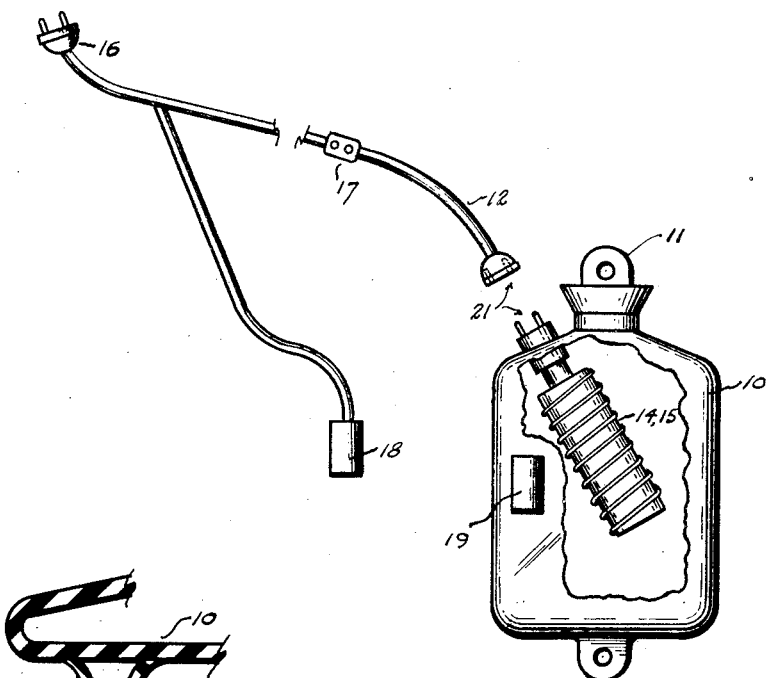
Fig. 1
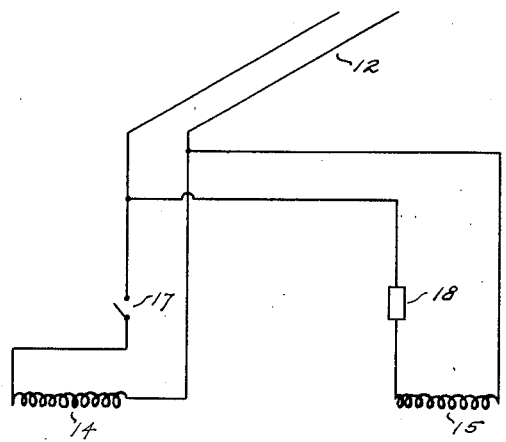
Fig. 2
Fig. 3
INVENTOR.
Frank Maccoy
BY Daniel G. Cullen, attorney Patented June 9, 1942

2,285,776

UNITED STATES PATENT OFFICE 2,285,776

HOT WATER BOTTLE

Frank Maccoy, Detroit, Mich.

Application September 12, 1941, Serial No. 410,559

12 Claims. (Cl. 219—38)

This application relates to hot water bottles.

A principal object of the invention is to provide a hot water bottle having an electric heating coil arranged to be controlled by a thermostatic control switch for maintaining the contained water at a desired temperature, with the thermostatic switch being outside of and disposed against the outer surface of the bottle so as to be responsive to the temperature of the outside surface of the bottle, rather than to the temperature of the water.

Other objects will be understood upon reference to the embodiment of the invention which has been disclosed in the appended drawing. In this drawing:

Figure 1 is a front view of the bottle;

Figure 2 is a transverse section; and

Figure 3 is a wiring diagram.

Referring to the drawing, it will be seen that a conventional rubber hot water bottle 10 is shown as provided with a filling spout 11 having a stopper.

Through a sealed hole in the edge of the bottle, preferably remote from the spout, passes an electric cord having two coils 14 and 15 on the end of the cord within the bottle. Coil 14 will be known as the initial heating coil and coil 15 will be known as the maintenance coil. A line connector 16 on the end of the cord outside the bottle is supplied for connecting the cord to an electric line. Also outside of the bottle and mounted on the cord 12 are two switches 17 and 18, the first of which is a manual switch for controlling the initial heating coil 14 and the second of which is a thermostatic switch for controlling the maintenance coil 15.

For holding the thermostatic switch 18 against the outside surface of the bottle, there is formed a pocket 19 either integral with or adhesively secured to the outside surface of the bottle.

Reference to the wiring diagram, Figure 3, will show how coil 14 is controlled solely by the manual switch 17 and how maintenance coil 15 is controlled solely by the thermostat switch 18.

Whereas it has been stated that the cord passes through and seals an opening in the bag, in actual practice it may be preferred to sever the cord 12 at the point where it passes through the bag opening and to form the cord of two parts, each of which has on its end, at that point, a part of an interposed connector, referenced as a whole 21. One of the connector parts will be secured to the bottle and seal the opening therein and have prongs for making contact with contacts within the other connector part mounted on that part of the cord outside the bottle. If desired, however, the cord may be unitary rather than separated at the point where it passes through the bottle, in which case, no interposed connector 21 will be utilized.

Now having described the hot water bottle herein disclosed, reference should be had to the claims which follow for a determination of the inventions hereof.

I claim:

1. A hot water bottle having a filling spout, heating coils within the bottle, means passing through the bottle at a point remote from said spout for connecting one of said coils to an electric line and arranged with a manual switch outside the bottle for controlling said coil, means also passing through the bottle at a point remote from said spout for connecting the other of said coils to said electric line in a manner independent of said switch, and a thermostatic switch disposed against the outside surface of said bottle for automatically controlling said second coil in response to the temperature of the outside surface of the bottle.

2. A hot water bottle having a filling spout, heating coils within the bottle, means passing through the bottle at a point remote from said spout for connecting one of said coils to an electric line and arranged with a manual switch outside the bottle for controlling said coil, means also passing through the bottle at a point remote from said spout for connecting the other of said coils to said electric line in a manner independent of said switch, and a thermostatic switch outside of said bottle for automatically controlling said second coil in response to the temperature of the outside surface of the bottle, the bottle being formed with a pocket on its outside surface within which is disposed the thermostatic switch, the latter thus being held against the outside surface of the bottle.

3. A hot water bottle having a filling spout, and an opening in a wall thereof at a point remote from said spout, an electric cord passing through and sealing said opening, two independently operable heating coils on an end of said cord within said bottle, means on the end of said cord outside said bottle for connecting the cord to an electric line, switches on said cord outside the bottle for independently controlling said coils, one of said switches being manual, the other being thermostatic and arranged to be responsive to the temperature of the outer surface of the bottle.

4. A hot water bottle having a filling spout, and an opening in a wall thereof at a point remote from said spout, an electric cord passing through and sealing said opening, two independently operable heating coils on an end of said cord within said bottle, means on the end of said cord outside said bottle for connecting the cord to an electric line, switches on said cord outside the bottle for independently controlling said coils, one of said switches being manual, the other being thermostatic and arranged to be responsive to the temperature of the outer surface of the bottle, the bottle being formed with a pocket on its outside surface within which is disposed the thermostatic switch, the latter thus being held against the outside surface of the bottle.

5. A hot water bottle having a filling spout, and an opening in a wall thereof at a point remote from said spout, an electric cord passing through and sealing said opening, two independently operable heating coils on an end of said cord within said bottle, means on the end of said cord outside said bottle for connecting the cord to an electric line, switches on said cord outside the bottle for independently controlling said coils, one of said switches being manual, the other being thermostatic and arranged to be responsive to the temperature of the outer surface of the bottle, the cord being separated into two parts having an interposed separable connector, the separation point and the interposed separable connector being at the point where the cord passes through the bottle opening, with one of the connector parts sealing said opening.

6. A hot water bottle having a filling spout, and an opening in a wall thereof at a point remote from said spout, an electric cord passing through and sealing said opening, two independently operable heating coils on an end of said cord within said bottle, means on the end of said cord outside said bottle for connecting the cord to an electric line, switches on said cord outside the bottle for independently controlling said coils, one of said switches being manual, the other being thermostatic and arranged to be responsive to the temperature of the outer surface of the bottle, the cord being separated into two parts having an interposed separable connector, the separation point and the interposed separable connector being at the point where the cord passes through the bottle opening, with one of the connector parts sealing said opening, the bottle being formed with a pocket on its outside surface within which is disposed the thermostatic switch, the latter thus being held against the outside surface of the bottle.

7. A hot water bottle having a filling spout, and an opening in a wall thereof at a point remote from said spout, an electric cord passing through and sealing said opening, two independently operable heating coils on an end of said cord within said bottle, means on the end of said cord outside said bottle for connecting the cord to an electric line, switches on said cord outside the bottle for independently controlling said coils, one of said switches being manual, the other being thermostatic and arranged to be responsive to the temperature of the outer surface of the bottle, the cord being separated into two parts having an interposed separable connector, the separation point and the interposed separable connector being at the point where the cord passes through the bottle opening, with one of the connector parts sealing said opening, one of the cord parts, within the bottle, including the last named connector part on one end and the coils on the other, and the other cord part, outside the bottle, including the other connector part on one end, the manual switch, and the thermostatic switch, and the line connector, on the other end.

8. A hot water bottle having a filling spout, and an opening in a wall thereof at a point remote from said spout, an electric cord passing through and sealing said opening, an electric heating coil on an end of said cord within said bottle, means on the end of said cord outside said bottle for connecting the cord to an electric line, a thermostatic switch on said cord disposed against the outside surface of the bottle for controlling said coil and arranged to be responsive to the temperature of the outer surface of the bottle.

9. A hot water bottle having a filling spout, and an opening in a wall thereof at a point remote from said spout, an electric cord passing through and sealing said opening, an electric heating coil on an end of said cord within said bottle, means on the end of said cord outside said bottle for conencting the cord to an electric line, a thermostatic switch on said cord outside the bottle for controlling said coil and arranged to be responsive to the temperature of the outer surface of the bottle, the bottle being formed with a pocket on its outside surface within which is disposed the thermostatic switch, the latter thus being held against the outside surface of the bottle.

10. A hot water bottle having a filling spout, and an opening in a wall thereof at a point remote from said spout, an electric cord passing through and sealing said opening, an electric heating coil on an end of said cord within said bottle, means on the end of said cord outside said bottle for connecting the cord to an electric line, a thermostatic switch on said cord disposed against the outside surface of the bottle for controlling said coil and arranged to be responsive to the temperature of the outer surface of the bottle, the cord being separated into two parts having an interposed separable connector, the separation point and the interposed separable connector being at the point where the cord passes through the bottle opening, with one of the connector parts sealing said opening.

11. A hot water bottle having a filling spout, and an opening in a wall thereof at a point remote from said spout, an electric cord passing through and sealing said opening, an electric heating coil on an end of said cord within said bottle, means on the end of said cord outside said bottle for connecting the cord to an electric line, a thermostatic switch on said cord outside the bottle for controlling said coil and arranged to be responsive to the temperature of the outer surface of the bottle, the cord being separated into two parts having an interposed separable connector, the separation point and the interposed separable connector being at the point where the cord passes through the bottle opening, with one of the connector parts sealing said opening, the bottle being formed with a pocket on its outside surafce within which is disposed the thermostatic switch, the latter thus being held against the outside surface of the bottle.

12. A hot water bottle having a filling spout, and an opening in a wall thereof at a point remote from said spout, an electric cord passing through and sealing said opening, an electric heating coil on an end of said cord within said bottle, means on the end of said cord outside said bottle for connecting the cord to an electric line, a thermostatic switch on said cord disposed against the outside surface of the bottle for controlling said coil and arranged to be responsive to the temperature of the outer surface of the bottle, the cord being separated into two parts having an interposed separable connector, the separation point and the interposed separable connector being at the point where the cord passes through the bottle opening, with one of the connector parts sealing said opening, one of the cord parts, within the bottle, including the last named connector part on one end and the coil on the other, and the other cord part, outside the bottle, including the other connector part on one end, the thermostatic switch, and the line connector on the other end.

FRANK MACCOY.